(12) United States Patent
Lakshmanamurthy et al.

(10) Patent No.: US 7,366,865 B2
(45) Date of Patent: Apr. 29, 2008

(54) ENQUEUEING ENTRIES IN A PACKET QUEUE REFERENCING PACKETS

(75) Inventors: Sridhar Lakshmanamurthy, Sunnyvale, CA (US); Sanjeev Jain, Shrewsbury, MA (US); Gilbert Wolrich, Framingham, MA (US); Debra Bernstein, Sudbury, MA (US)

(73) Assignee: Intel Corporation, Santa Clara, CA (US)

( * ) Notice: Subject to any disclaimer, the term of this patent is extended or adjusted under 35 U.S.C. 154(b) by 579 days.

(21) Appl. No.: 10/936,917

(22) Filed: Sep. 8, 2004

(65) Prior Publication Data

US 2006/0069869 A1    Mar. 30, 2006

(51) Int. Cl.
  *G06F 12/06*    (2006.01)
  *H04N 7/16*    (2006.01)
(52) U.S. Cl. .................. 711/170; 711/208; 370/412
(58) Field of Classification Search ............... 711/154, 711/159, 208, 169, 170, 202, 203, 118; 709/230, 709/214, 215, 202, 201; 370/423, 412, 413, 370/415, 417, 429; 710/130
See application file for complete search history.

(56) References Cited

U.S. PATENT DOCUMENTS

| | | | | |
|---|---|---|---|---|
| 6,523,060 | B1 * | 2/2003 | Kao | 709/202 |
| 6,724,767 | B1 * | 4/2004 | Chong et al. | 370/412 |
| 6,975,637 | B1 * | 12/2005 | Lenell | 370/412 |
| 7,058,064 | B2 * | 6/2006 | Nemirovsky et al. | 370/395.7 |
| 2006/0036817 | A1 | 2/2006 | Oza et al. | |
| 2006/0041725 | A1 | 2/2006 | Lakshmanamurthy et al. | |

FOREIGN PATENT DOCUMENTS

EP    0 679 028 B  *  5/2000

OTHER PUBLICATIONS

Dietz, Henry, et al. "CRegs: A New Kind of Memory for Referencing Arrays and Pointers," Proceedings Supercomputing '88, Nov. 14-18, 1988, Orlando, Florida, pp. 360-367.*
Melvin et al., "Extended Instruction Set for a Packet Processing Applications," Jul. 5, 2001.*
Intel IXP1200 Network Processor Family ATM OC-3/12/Ethernet IP Router Example Design, Application Note - Rev. 1.0, Mar. 20, 2002; 58 pp.

(Continued)

*Primary Examiner*—Pierre-Michel Bataille
(74) *Attorney, Agent, or Firm*—Konrad Raynes & Victor LLP; David W. Victor

(57) ABSTRACT

Provided are a method, system, network processor, network device, and article of manufacture for enqueueing entries in a packet queue referencing packets. When adding a packet to a first memory area, an entry is written to a packet queue in a second memory area referencing the added packet. A pointer is read referencing one end of the packet queue from a queue descriptor in the second memory area into a third memory area in one read operation. The pointer is updated in the third memory area to point to the added entry in the packet queue and the updated pointer in the third memory area is written to the queue descriptor in the second memory area in one write operation.

42 Claims, 7 Drawing Sheets

OTHER PUBLICATIONS

Adiletta, et al. "The Next Generation of Intel IXP Network Processors," http://developer.intel.com, c. Intel Corporation 2002; 13 pp.

Adiletta, et al. "Packet over SONET: Achieving 10 Gigabit/sec Packet Processing with an IXP2800," http://developer.intel.com, c. Intel Corporation 2002; 11 pp.

Lakshmanamurthy, et al. "Network Processor Performance Analysis Methodology," http://developer.intel.com, c. Intel Corporation 2002; 10 pp.

Naik, et al. "IXA Portability Framework: Preserving Software Investment in Network Processor Applications," http://developer.intel.com, c. Intel Corporation 2002; 11 pp.

* cited by examiner

ENQUEUEING ENTRIES IN A PACKET QUEUE REFERENCING PACKETS

BACKGROUND

Systems in a network environment communicate information in packets that encapsulate the information according to network communication protocols. Packets transmitted from one node to another node may be transmitted through one or more intervening routers that route the packets throughout the network or between networks. The router typically includes one or more network processors to process the packets. The network processor stores packets in a memory device, such as a Synchronous Dynamic Random Access Memory (SDRAM). When a packet is added to the SDRAM, an entry, referred to as a buffer descriptor, is added to a packet queue in another memory device, such as a Static Random Access Memory (SRAM), which is used to maintain information on the packets added to the SDRAM. The SRAM further maintains a queue descriptor including information on a packet queue of buffer descriptors, including a head and tail pointers and queue count of the number of buffer descriptors in the queue. The SRAM may include multiple queues for packets in the SDRAM. The queue descriptors may be stored in an on-board buffer in the SRAM memory controller In certain implementations, the minimum access size of the SRAM is eight bytes. The queue descriptors may be cached in buffers within the SRAM memory controller, such as on-chip buffers. To enqueue a queue descriptor onto the memory controller buffers when a packet is added to the SDRAM and a corresponding buffer descriptor is added to the packet queue in the SRAM memory, two read operations (8 bytes each) and three write operations (8 bytes each) may be performed. For instance, a write of 16 bytes (or two write transactions) is performed to evict and write back a previously cached queue descriptor in the memory controller buffer. The required queue descriptor is read, which may comprise a read of 16 bytes or 2 read transactions of 8 bytes each. The queue descriptor is then written in one write transaction, e.g., 8 bytes.

In certain implementations, a dequeue operation to remove a queue descriptor from the memory controller cache when a packet is removed from the SDRAM requires five operations, three read and two write operations. For instance, a write of 16 bytes or two write transactions is performed to evict and write back a previously cached queue descriptor from the memory controller cache. The queue descriptor is then read, which may occur in a 16 byte read, or two read transactions of 8 bytes each. Then the buffer descriptor is read in one 8 byte read transaction.

Thus, enqueue and dequeue operations consume memory bandwidth to perform the necessary read and write operations to enqueue and dequeue buffer descriptors on packet queues referencing packets added and removed from the SDRAM by the network processor.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
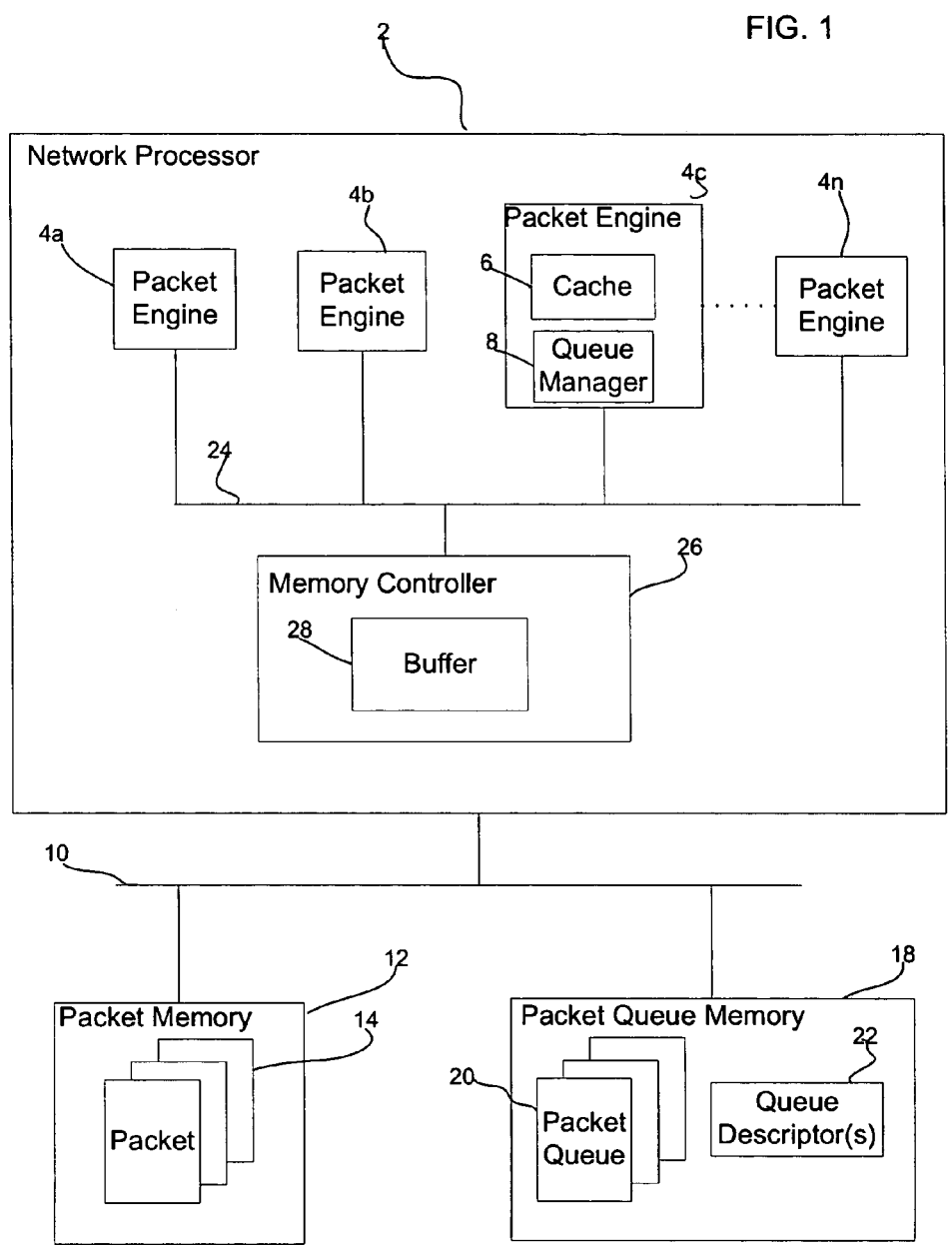
FIG. 1 illustrates a network processor.

A network processor comprises a device that executes programs to handle packets in a data network, such as processors on router line cards, network access equipment and packet forwarding devices. FIG. 1 illustrates one example of a network processor 2 including packet engines 4a, 4b . . . 4n comprising high speed processors specialized for packet processing. The packet engines may comprise any programmable engine or processor for processing packets, such as a microengine, etc. The packet engines 4a, 4b . . . 4n may execute program logic, such as microblocks, to process packets, where a microblock comprises fast-path packet processing logic executed by the packet engines 4a, 4b . . . 4n. The network processor packet engines 4a, 4b . . . 4n buffer packets and other information used to process packets in a cache 6.

A packet engine 4c includes a cache 6 and a queue manager 8 program. The cache 6 may be implemented on the same integrated circuit die on which the packet engine is implemented, i.e., an on-board or on-chip buffer, and comprise a content address memory. In alternative embodiments, the data stored in the cache 6 may be stored in a memory device external to the packet engine 4c. The queue manager 8, executed by the packet engine 4c, receives enqueue requests from other of the packet engines 4a, 4b . . . 4n that are programmed to perform receive processing and classification. The enqueue request specifies to which output queue an arriving packet or cell should be added. A packet engine 4a, 4b . . . 4n that functions as the transmit scheduler sends dequeue requests to the queue manager 8 that specifies the output queue from which a packet or cell is to be taken and then transmitted to an output interface The network processor 2 may communicate over one or more memory interfaces 10 with a packet memory 12 for storing packets 14 and a packet queue memory 18 storing packet queues 20 and queue descriptors 22 including information defining the packet queues 20 in the packet queue memory 18. In certain embodiments, the packet memory 12 may comprise at least one SDRAM and the packet queue memory 18 may comprise at least one SRAM, such as a Quad Data Rate (QDR) high bandwidth SRAM. However, other types of memory devices known in the art may also be used. Further, in alternative embodiments, the packet memory 12 and packet queue memory 12 may be within different memory areas of the same memory device or in different memory areas of different memory devices. The reference numbers 16, 20, and 22 may represent one or more of the referenced items.

The packet engines 4a, 4b . . . 4n may communicate over one or more bus interfaces 24 to a memory controller 26 providing access to the packet queue memory 18, such as an SRAM or other memory device known in the art. The memory controller 26 includes logic to perform memory access operations and a buffer 28, such as an on-board cache, to buffer the queue descriptors 22. The packet queue memory 18 may be external to the network processor 2 or implemented on an integrated circuit substrate on which the network processor 2 is implemented, i.e., an on-board memory device 18. In certain embodiments, the memory controller 24 is implemented on the integrated circuit substrate including the network processor 2.

The queue manager 8, executed by packet engine 4c, issues commands to return queue descriptors 20 from the cache 6 to the packet queue memory 16 and fetch new queue descriptors from the packet queue memory 16 to the cache 6, such that the queue descriptors 20 in the cache 6 remains coherent with data store located in the packet queue memory 16. The queue manager 8 issues enqueue and dequeue commands indicating which of the queue descriptors 20 in cache 6 to use for the command. All enqueue and dequeue commands are executed in the order in which they arrived.

Figure 2:
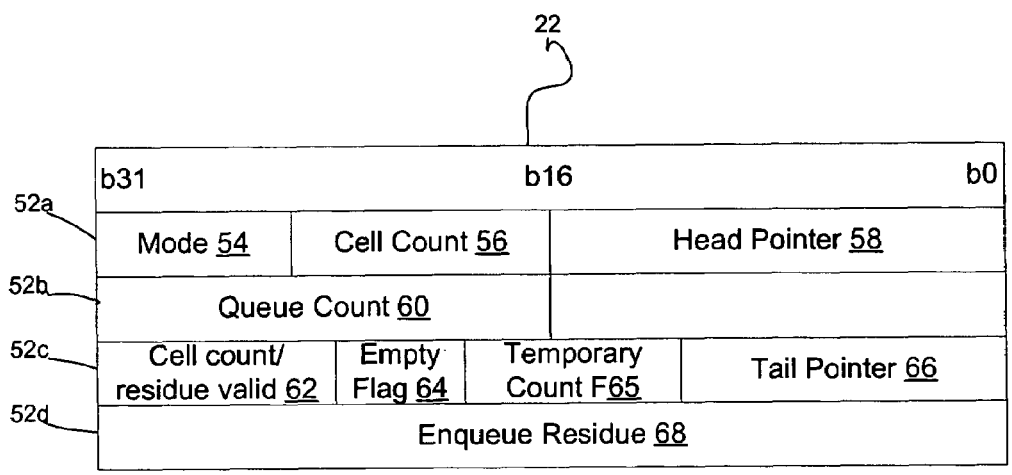
FIG. 2 illustrates a queue descriptor.

FIG. 2 illustrates an example of a queue descriptor 50 comprised of four 32 bit (four byte) words 52a, 52b, 52c, 52d, so that the entire queue descriptor comprises 16 bytes. The queue descriptor 22 describing one packet queue 20 may include the following information:

Mode 54: indicates the content on which the queue is acting, e.g., packets, cells, etc.

Cell Count 56: indicates a number of cells in a head packet.

Head Pointer 58: points to a first buffer descriptor entry in the queue, which may comprise the most recently added buffer descriptor in the queue.

Queue Count 60: indicates the number of entries in a packet queue 20, where the entries may comprise buffer descriptors that reference packets 16 in the packet memory 12.

Cell Count/Residue Valid 62: indicates whether the cell count field 56 is valid and whether there is residue. Residue indicates bytes waiting to be written as part of a full write access. For instance, if a full write access is eight bytes and there are four bytes to write, then these four bytes will be maintained as residue until another four bytes are available to write so that a full eight bytes of data can be written.

Empty Flag 64: indicates whether the queue is currently empty. The empty flag may occupy one bit.

Temporary Queue Counter 65: used during dequeue and enqueue operations to count the number of operations. The temporary queue counter 65 provides a temporary counter of a number of buffer descriptors 82a, 82b . . . 82n added to one packet queue 20, where temporary queue counters 65 for different packet queues 20 may have different values.

Tail Pointer 66: points to a buffer descriptor entry in the queue, which may comprise the oldest buffer descriptor in the queue.

Engueue Residue 68: as mentioned if there is less than a full access of bytes to write, e.g., eight bytes, then those residue bits are kept in the enqueue residue 68 field until there is the maximum number of bytes available to write for a full write access.

Figure 3:
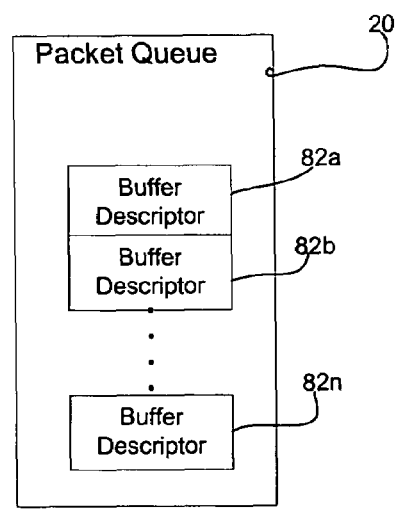
FIG. 3 illustrates a packet queue.

FIG. 3 illustrates a packet queue 20 including a plurality of buffer descriptors 82a, 82b . . . 82n. As discussed each buffer descriptor 82a, 82b . . . 82n references one packet 14 in the packet memory 12. The queue descriptors 22 including information on the packet queues 20 having the buffer descriptors are maintained in the packet queue memory 18 and are also buffered in the cache 6 for fast-access by the packet engine 4c to provide information to enable the packet engine 6c to access the packet queues 20 in the packet queue memory 18 and buffer descriptors 82a, 82b . . . 82n therein.

Figure 4:
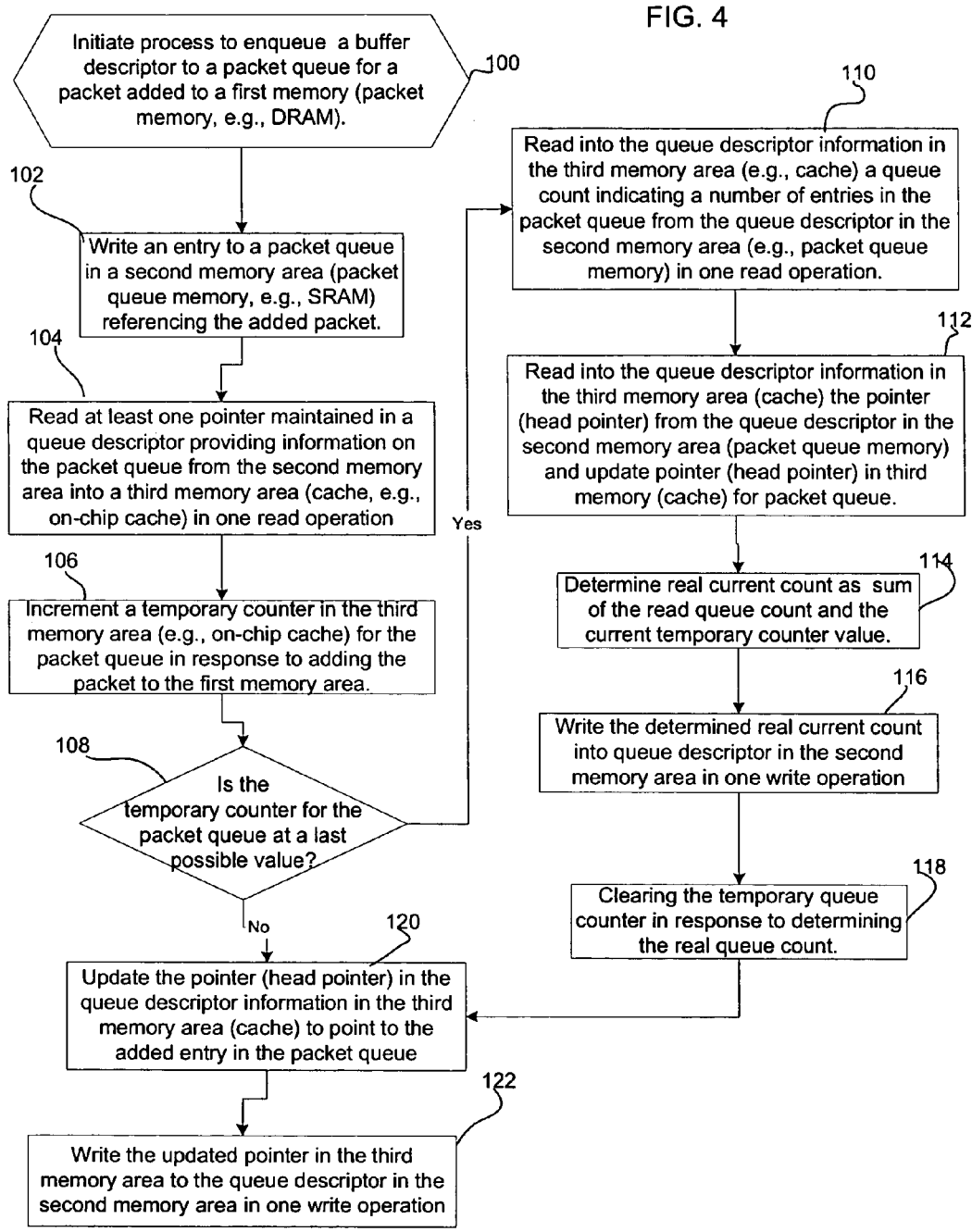
FIGS. 4, 5, and 6 illustrate operations to enqueue and dequeue entries onto a packet queue.

FIG. 4 illustrates operations the queue manager 8, executed by the packet engine 4c, performs to enqueue (at block 100) a buffer descriptor 82n (FIG. 3) to a packet queue 20 for a packet added to the packet memory 12. Described embodiments maintain bookkeeping information, or partial queue descriptor information, on the packet queue in the cache 6, which may be the fastest access memory. In this way, I/O transactions are conserved by not reading in all the queue descriptor 22 information into the cache 6. The packet 16 may be added to the packet memory 12 (e.g., DRAM) by a packet engine 4a, 4b . . . 4n other than the queue manager 8 packet engine 4c. In response to adding a packet 16 to the packet memory 12, an entry, such as a buffer descriptor 82n, is written (at block 102) to a packet queue 20 in a second memory area, such as packet queue memory 18 (e.g., SRAM), referencing the added packet 16. In certain embodiments, the entry, e.g., buffer descriptor 82n, is written to the packet queue, e.g., 20, in one write operation. The queue manager 8 reads (at block 104) at least one pointer, such as the tail 66 and head 58 pointers, into a third memory area, e.g., cache 6, in one read operation and increments (at block 106) a temporary counter, e.g., temporary queue counter 65, in the third memory area, e.g., cache 6 (e.g., on-board cache), for the packet queue 20 to which the entry, e.g., buffer descriptor 82n, is added. In certain embodiments, the temporary queue counter 65 is part of the queue descriptor information maintained in the cache 6.

If (at block 108) the temporary counter, e.g., temporary queue counter 65, for the packet queue 20 to which the entry is added is at a last (maximum) possible value, i.e., needs to roll over, then the queue manager 8 reads (at block 110) into the third memory area, e.g., cache 6, a queue count, such as queue count 60, indicating a number of entries in the packet queue 20 from the queue descriptor 22 in the second memory area in one read operation. At this point, the queue count 60 from the queue descriptor 22 in the packet queue memory 18 may not reflect the true number of buffer descriptors 82a, 82b . . . 82n in the packet queue 20 because enqueued entries since the last roll-over of the temporary queue counter 20 are reflected in the temporary queue counter 20. In certain embodiments, the queue manager 8 may read words 52a, 52b to perform a full read access of eight bytes, because each word is four bytes, where the read words 52a, 52b include the head pointer 58 (at block 112) as well as the queue count 60. The queue manager 8 determines (at block 114) an updated or real queue count, e.g., 60, comprising a sum of the read queue count 60 and the last temporary counter 65 value. The queue manager 8 then writes (at block 116) the determined queue count to the queue count 60 in the queue descriptor 22 in the second memory area, e.g., packet queue memory 18, in one write operation. In certain embodiments, the queue manager 8 may write words 52a, 52b read into the cache 6, including the updated queue count 60, into the queue descriptor 20 in the packet queue memory 18, so that a full write access is performed to write and update the queue count 60. The temporary queue counter 65 for the packet queue 20 subject to the enqueueing is also cleared (at block 118).

From the no branch of block 108 or from block 116, the queue manager 8 updates (at block 120) the pointer, e.g., head pointer 58, in the third memory area, e.g., cache 6, to point to the added entry, e.g., added buffer descriptor 82n, in the packet queue, e.g., packet queue 20. The queue manager 8 then writes (at block 122) the updated pointer in the third memory area to the queue descriptor in the second memory area, e.g., packet queue memory 18, in one write operation. In certain embodiments, the queue manager 8 may write words 52b, 52d read into the cache 6, including the updated head pointer 58, into the queue descriptor 20 in the packet queue memory 18, so that a full write access is performed to write and update the head pointer 58 referencing the added buffer descriptor 82n.

In certain embodiments, the pointer, e.g., head pointer 58, in the third memory area, e.g., cache 6, is written to the queue descriptor, e.g., 22, in the second memory area, e.g., packet queue memory 18, in the one write operation in response to evicting information from the queue descriptor in the third memory area (cache 6) to enable reading into the third memory area information from an additional queue descriptor referencing an additional packet queue in the second memory in one read operation. Thus, the queue descriptor 22 in the packet queue memory 18 is not updated with updated queue descriptor information, such as a new queue count 60 and pointers 58 and 66, until the queue descriptor 22 including such updated information is evicted from the cache 6 to make room in the cache 6 for information from a queue descriptor 22 for a packet queue 20 not presently in the cache 6 that the queue manager 8 needs to access.

Figure 5:
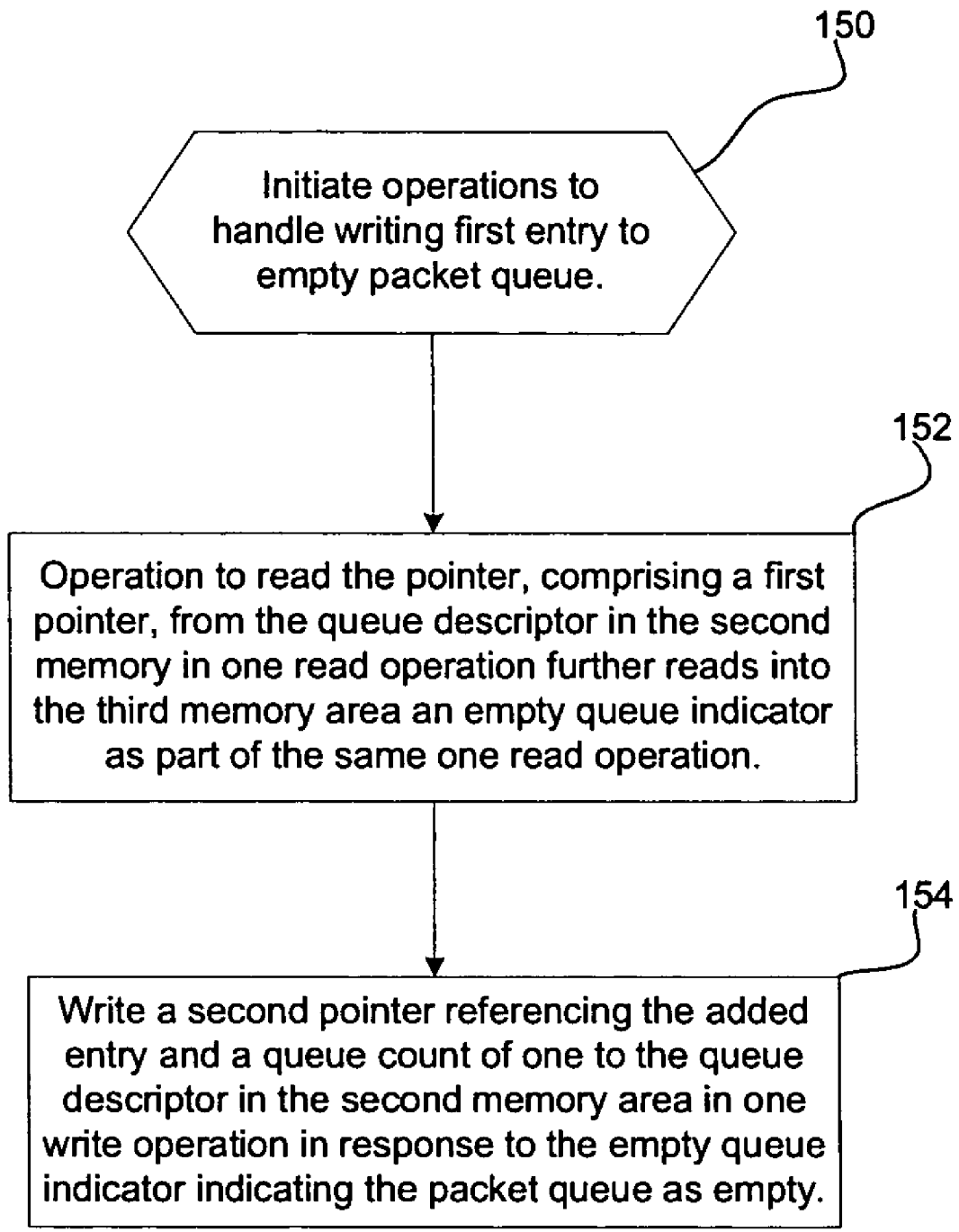

FIG. 5 illustrates operations implemented in the queue manager 8 to handle the situation when the buffer descriptor 82n being enqueued on a packet queue 20 comprises the first buffer descriptor in that packet queue 20. In certain embodiments, when writing the first entry to the packet queue 20, the queue manager 8 operation (at block 152) to read the pointer, comprising a first pointer (e.g., the tail pointer 66) from the queue descriptor 22 in the second memory (e.g., 18) in one read operation further reads into the third memory area, e.g., cache 6, an empty queue indicator, e.g., empty flag 64, as part of the read operation. In certain embodiments, the empty queue indicator may be included in the queue descriptor 22, e.g., the empty flag 66. In response to the empty queue indicator, e.g., empty flag 64, indicating that the packet queue 20 is empty, the queue manager 8 writes (at block 154) a second pointer, e.g., the head pointer 58, referencing the added entry and a queue count, e.g., 60, of one to the queue descriptor, e.g., 22, in the second memory area, e.g., packet queue memory 18, in one write operation. In certain embodiments, the queue manager 8 reads words 52a, 52b of the queue descriptor 22 (FIG. 2) in one eight byte full access read operation and then writes the updated queue descriptor words 52a, 52b including the updated head pointer 58 and queue count 60 to the packet queue memory 18. In this way, a full access eight byte write is performed to write the updated head pointer 58 and queue count 60.

In certain embodiments, the first pointer comprises a tail pointer pointing to an end of the packet queue to which dequeued are removed and the second pointer comprises a head pointer pointing to an end of the packet queue to which entries are dequeued.

In certain embodiments, the second pointer, e.g., head pointer 58, and the queue count in the third memory area are written to the queue descriptor in the second memory area, e.g., packet queue memory 18, in the one write operation in response to evicting information in the queue descriptor, such as words 52a, 52b, from the third memory area, e.g., local memory area 6, to make room for a new queue descriptor. Thus, the queue descriptor 22 in the packet queue memory 18 is not updated with new information, such as the queue count 60 of one and the head pointer pointing to the first buffer descriptor entry 82n in the packet queue 28, until the queue descriptor 22 including such updated information is evicted from the cache 6 to make room for a queue descriptor 22 not presently in the cache 6.

Figure 6:
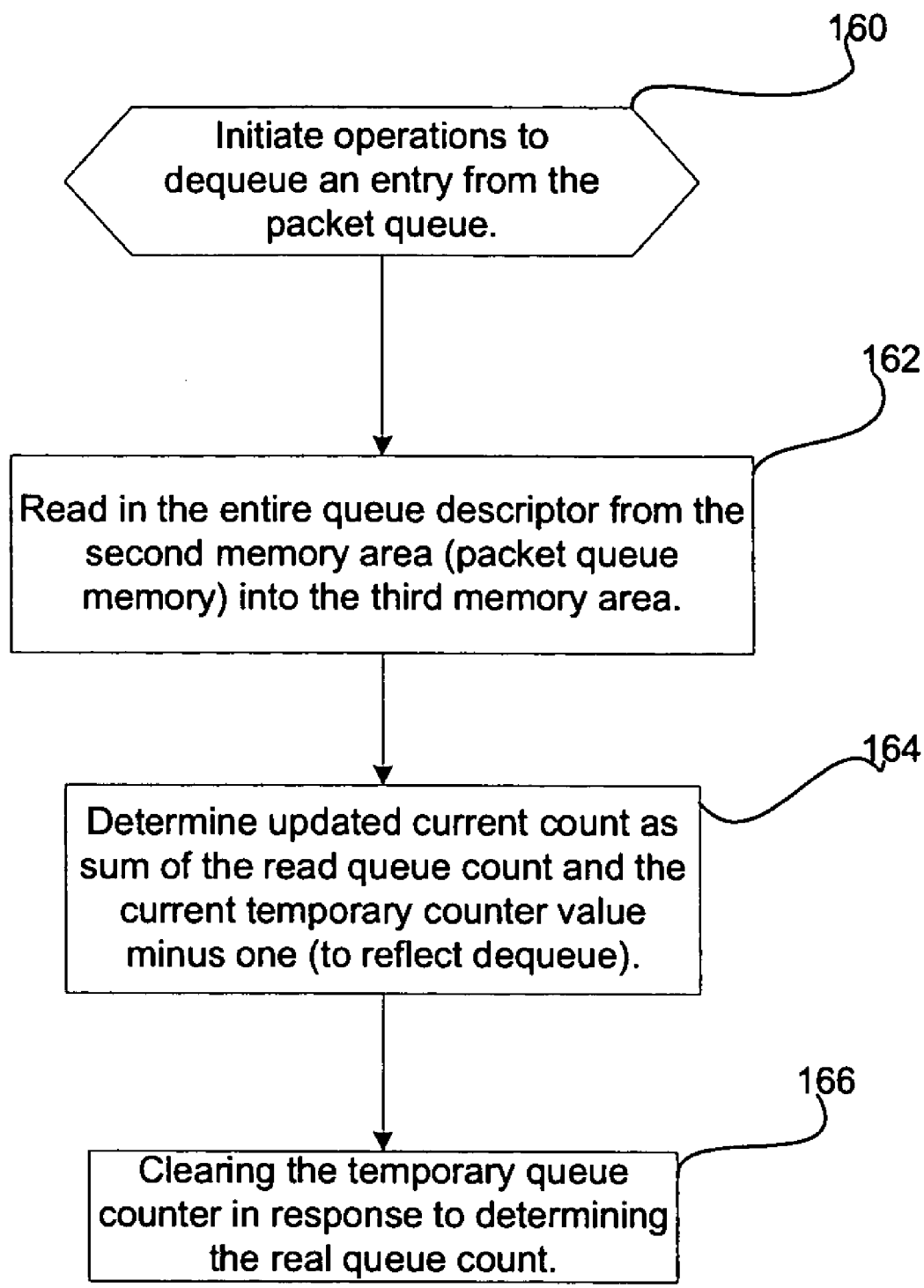

FIG. 6 illustrates operations performed by the queue manager 8 when dequeueing a buffer descriptor from a packet queue 20. Upon initiating (at block 160) operations to dequeue an entry, e.g., buffer descriptor 82a, 82b . . . 82n, from the packet queue 20, which may occur when a packet 14 corresponding to the buffer descriptor is dequeued, the queue manager 8 reads (at block 162) in the entire queue descriptor 20 from the second memory area (packet queue memory) into the third memory area (cache 6). The queue manager 8 determines (at block 164) a real current count of the entries in the packet queue 20 as a sum of the read queue count, e.g., 60, and the current temporary counter value 65 already in the cache 6 minus one (to reflect the dequeue). The temporary queue counter 65 is cleared (at block 166) in response to determining the real queue count. The current real count in the cache 6 may at some point be written to the queue count 60 field in the queue descriptor 22 in the packet queue memory 18, such as when the counter rolls over at block 116 in FIG. 4.

In certain embodiments, a packet engine, e.g., 4c, in a network processor, e.g., 2, performs the operations of writing the entry, reading the pointer, updating the pointer, and writing the pointer. Further, the first and second memory areas, e.g., packet memory 12 and packet queue memory 18, may be external to the network processor and the third memory area, e.g., cache 6, may be implemented on a die, such as an integrated circuit die, in which the packet engine 4c performing the operations is implemented.

In certain instances, the number of operations to enqueue a buffer descriptor onto a packet queue involves one read operation and two writes. For instance, if the temporary queue counter 30 is not at the last possible value and the packet queue 20 is not empty, then one read operation is performed to read in words 52c and 52d that include the head pointer 58 to be updated to point to the enqueued buffer descriptor 82n. Two writes are then performed, one to write the added buffer descriptor pointing to the packet added to the packet memory 12 and another to write back words 52c and 52d to the queue descriptor 20 during eviction of that queue pointer. If the temporary queue counter 65 is at a last possible value, then an additional read and write are performed to read in words 52a, 52b including the queue count 60 and then writing back an updated real queue count 60 before clearing the queue counter 65 for the packet queue being updated. In this way, described embodiments defer the read and write operations needed to update the real queue count 60 until the queue counter reaches its maximum possible value and rolls over. During typical operations, the queue counter 65 roll over rarely occurs because dequeue operations to the packet queue 20, which often regularly occur, decrement the queue counter 30. Yet further, if the first buffer descriptor 82n is being enqueued onto an empty packet queue 20, then an additional read and two writes are performed to read in words 52a, 52b including the queue count 60 and head pointer 50. Two writes are performed to write back words 52a, 52b, 52c, 52d of the queue descriptor including the updated queue count 60 and updated head 58 and tail 66 pointers referencing the first buffer descriptor added to the empty packet queue 20.

Figure 7:
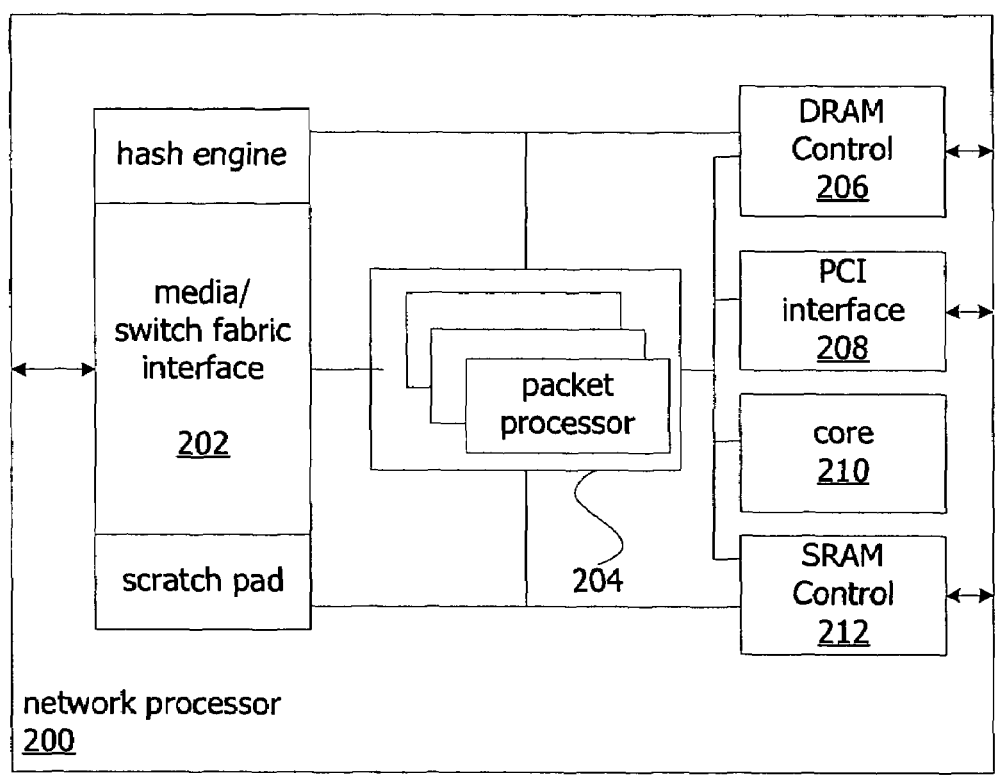
FIG. 7 is a diagram of a network processor.

FIG. 7 illustrates another example of a network processor 200. The network processor 200 shown is an Intel® Internet eXchange Network Processor (IXP). Other network processors feature different designs. The network processor 200 shown features a collection of packet engines 204, also known as a microengine, programmable engine, etc. The packet engines 204 may be Reduced Instruction Set Computing (RISC) processors tailored for packet processing. For example, the packet engines 204 may not include floating point instructions or instructions for integer multiplication or division commonly provided by general purpose processors. The network processor 200 components may be implemented on a single integrated circuit die.

An individual packet engine 204 may offer multiple threads. For example, the multi-threading capability of the packet engines 204 may be supported by hardware that reserves different registers for different threads and can quickly swap thread contexts. In addition to accessing shared memory, a packet engine may also feature local memory and a content addressable memory (CAM). The packet engines 204 may communicate with neighboring processors 204, for example, using neighbor registers wired to the adjacent engine(s) or via shared memory.

The network processor 200 also includes a core processor 210 (e.g., a StrongARM® XScale®) that is often programmed to perform "control plane" tasks involved in network operations. (StrongARM and XScale are registered trademarks of Intel Corporation). The core processor 210, however, may also handle "data plane" tasks and may provide additional packet processing threads.

As shown, the network processor 200 also features interfaces 202 that can carry packets between the processor 200 and other network components. For example, the processor 200 can feature a switch fabric interface 202 (e.g., a CSIX interface) that enables the processor 200 to transmit a packet to other processor(s) or circuitry connected to the fabric. The processor 200 can also feature an interface 202 (e.g., a System Packet Interface Level 4 (SPI-4) interface) that enables to the processor 200 to communicate with physical layer (PHY) and/or link layer devices. The processor 200 also includes an interface 208 (e.g., a Peripheral Component Interconnect (PCI) bus interface) for communicating, for example, with a host. As shown, the processor 200 also includes other components shared by the engines such as memory controllers 206, 212, a hash engine, and scratch pad memory.

The queue manager operations described above may be implemented on a network processor, such as the IXP, in a wide variety of ways. For example, one or more threads of a packet engine 204 may perform specific queue manager.

In certain embodiments, the packet engine implementing the queue manager operations described with respect to FIGS. 4, 5 and 6 may be implemented in one of the packet processors 204.

Figure 8:
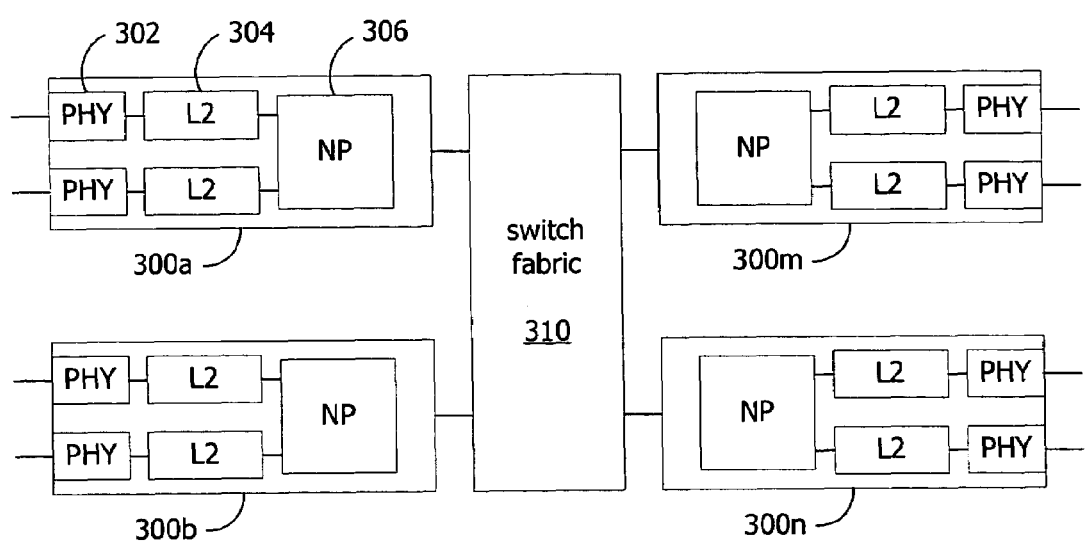
FIG. 8 is a diagram of a network device.

FIG. 8 depicts a network device incorporating techniques described above. As shown, the device features a collection of line cards 300 ("blades") interconnected by a switch fabric 310 (e.g., a crossbar or shared memory switch fabric). The switch fabric, for example, may conform to CSIX or other fabric technologies such as HyperTransport, Infiniband, PCI-X, Packet-Over-Synchronous Optical Network (SONET), RapidIO, and Utopia. CSIX is described in the publication "CSIX-L1: Common Switch Interface Specification-L1", Version 1.0, published August, 2000 by CSIX; HyperTransport is described in the publication "HyperTransport I/O Link Specification", Rev. 1.03, published by the HyperTransport Tech. Consort., October, 2001; InfiniBand is described in the publication "InfiniBand Architecture, Specification Volume 1", Release 1.1, published by the InfiniBand trade association, November 2002; PCI-X is described in the publication PCI-X 2.0 Specification by PCI-SIG; SONET is described in the publication "Synchronous Optical Network (SONET)—Basic Description including Multiplex Structure, Rates and Formats," document no. T1X1.5 by ANSI (January 2001); RapidIO is described in the publication "RapidIO Interconnect Specification", Rev. 1.2, published by RapidIO Trade Ass'n, June 2002; and Utopia is described in the publication "UTOPIA: Specification Level 1, Version 2.01", published by the ATM Forum Tech. Comm., March, 1994.

Individual line cards (e.g., 300a) include one or more physical layer (PHY) devices 302 (e.g., optic, wire, and wireless PHYs) that handle communication over network connections. The PHYs translate between the physical signals carried by different network mediums and the bits (e.g., "0"-s and "1"-s) used by digital systems. The line cards 300 may also include framer devices (e.g., Ethernet, Synchronous Optic Network (SONET), High-Level Data Link (HDLC) framers or other "layer 2" devices) 304 that can perform operations on frames such as error detection and/or correction. The line cards 300 shown also include one or more network processors 306 or integrated circuits (e.g., ASICs) that perform packet processing operations for packets received via the PHY(s) 300 and direct the packets, via the switch fabric 310, to a line card providing the selected egress interface. Potentially, the network processor(s) 306 may perform "layer 2" duties instead of the framer devices 304 and the network processor operations described herein.

While FIGS. 7 and 8 describe an example of a network processor and a device incorporating network processors, the techniques may be implemented in other hardware, firmware, and/or software. For example, the techniques may be implemented in integrated circuits (e.g., Application Specific Integrated Circuits (ASICs), Gate Arrays, and so forth). Additionally, the techniques may be applied to a wide variety of networking protocols at different levels in a protocol stack and in a wide variety of network devices (e.g., a router, switch, bridge, hub, traffic generator, and so forth).

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In certain embodiments, the enqueue and dequeue operations are performed by a process implemented in a microblock executed by a packet engine, e.g., microengine of a network processor. In additional embodiments, the enqueue and dequeue operations may be performed by different types of processors, including central processing units, Input/Output controllers, storage controllers, etc.

The term packet was sometimes used in the above description to refer to a packet conforming to a network communication protocol. However, a packet may also be a frame, fragment, ATM cell, and so forth, depending on the network technology being used. Alternatively, a packet may refer to a unit of data transferred from devices other than network devices, such as storage controllers, printer controllers, etc.

Preferably, the threads are implemented in computer programs such as a high level procedural or object oriented programming language. However, the program(s) can be implemented in assembly or machine language if desired. The language may be compiled or interpreted. Additionally, these techniques may be used in a wide variety of networking environments.

The illustrated operations of FIGS. 4, 5 and 6 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
    adding a packet to a first memory area;
    writing an entry to a packet queue in a second memory area referencing the added packet in one write operation;
    reading a pointer referencing one end of the packet queue from a queue descriptor in the second memory area into a third memory area in one read operation;
    updating the pointer in the third memory area to point to the added entry in the packet queue following the adding of the entry to the packet queue and reading of the pointer into the third memory area; and
    writing the updated pointer in the third memory area to the queue descriptor in the second memory area in one write operation.

2. The method of claim 1, wherein the writing of the entry to the packet queue is performed in one write operation.

3. The method of claim 1, further comprising:
    incrementing a counter in the third memory area for the packet queue in response to adding the packet to the first memory area.

4. The method of claim 3, further comprising:
    reading into the third memory area a queue count indicating a number of entries in the packet queue from the queue descriptor in the second memory area in one read operation in response to the counter being a last counter value;
    determining an updated queue count comprising a sum of the read queue count and the last counter value; and
    writing the updated queue count into the queue descriptor in the second memory area in one write operation.

5. The method of claim 4, further comprising:
    clearing the counter in response to generating the updated queue count.

6. The method of claim 3, further comprising:
    reading into the third memory area a queue count indicating a number of entries in the packet queue from the queue descriptor in the second memory area in one read operation in response to performing a dequeue operation to remove a packet from the first memory area; and
    determining an updated queue count comprising a sum of the read queue count and the last counter value less one.

7. The method of claim 1, wherein a packet engine in a network processor performs the operations of writing the entry, reading the pointer, updating the pointer, and writing the pointer, and wherein the first and second memory areas are external to the network processor and wherein the third memory area is implemented on a die in which the packet engine performing the operations is implemented.

8. The method of claim 1, wherein the pointer in the third memory area is written to the queue descriptor in the second memory area in the one write operation in response to evicting information from the queue descriptor in the third memory area to enable reading into the third memory area information from an additional queue descriptor referencing an additional packet queue in the second memory in one read operation.

9. The method of claim 1, wherein the pointer comprises a first pointer, further comprising:
    reading into the third memory area an empty queue indicator as part of the one read operation reading the first pointer; and
    writing a second pointer referencing the added entry and a queue count of one to the queue descriptor in the second memory area in one write operation in response to the empty queue indicator indicating the packet queue as empty.

10. The method of claim 9, wherein the first pointer comprises a tail pointer pointing to an end of the packet queue to which enqueued entries are added and the second pointer comprises a head pointer pointing to an end of the packet queue from which entries are dequeued.

11. The method of claim 9, wherein the second pointer and the queue count in the third memory area are written to the queue descriptor in the second memory area in the one write operation in response to evicting information in the packet descriptor from the third memory area to enable reading into the third memory area information from an additional queue descriptor referencing an additional packet queue in the second memory in one read operation.

12. An article of manufacture in communication with a first, second, and third memory areas, wherein the article of manufacture is enabled to cause operations to be performed, the operations comprising:

maintaining queue descriptor information on a packet queue having entries referencing packets in the first memory area, wherein the queue descriptor information is maintained in the second and third memory areas;

adding a packet to the first memory area;

writing an entry to the packet queue in the second memory area referencing the added packet in one write operation;

reading a pointer referencing one end of the packet queue from the queue descriptor in the second memory area into the third memory area in one read operation;

updating the pointer in the third memory area to point to the added entry in the packet queue following the adding of the entry to the packet queue and reading of the pointer into the third memory area; and writing the updated pointer in the third memory area to the queue descriptor in the second memory area in one write operation.

13. The article of manufacture of claim 12, wherein the writing of the entry to the packet queue is performed in one write operation.

14. The article of manufacture of claim 12, wherein the operations further comprise:

incrementing a counter in the third memory area for the packet queue in response to adding the packet to the first memory area.

15. The article of manufacture of claim 14, wherein the operations further comprise:

reading into the third memory area a queue count indicating a number of entries in the packet queue from the queue descriptor in the second memory area in one read operation in response to the counter being a last counter value;

determining an updated queue count comprising a sum of the read queue count and the last counter value; and writing the updated queue count into the queue descriptor in the second memory area in one write operation.

16. The article of manufacture of claim 15, wherein the operations further comprise:

clearing the counter in response to generating the updated queue count.

17. The article of manufacture of claim 14, wherein the operations further comprise:

reading into the third memory area a queue count indicating a number of entries in the packet queue from the queue descriptor in the second memory area in one read operation in response to performing a dequeue operation to remove a packet from the first memory area; and determining an updated queue count comprising a sum of the read queue count and the last counter value less one.

18. The article of manufacture of claim 12, wherein the article of manufacture is implemented in a packet engine in a network processor that performs the operations of writing the entry, reading the pointer, updating the pointer, and writing the pointer, and wherein the first and second memory areas are external to the network processor and wherein the third memory area is implemented on a die in which the packet engine performing the operations is implemented.

19. The article of manufacture of claim 12, wherein the pointer in the third memory area is written to the queue descriptor in the second memory area in the one write operation in response to evicting information from the queue descriptor in the third memory area to enable reading into the third memory area information from an additional queue descriptor referencing an additional packet queue in the second memory in one read operation.

20. The article of manufacture of claim 12, wherein the pointer comprises a first pointer, further comprising:

reading into the third memory area an empty queue indicator as part of the one read operation reading the first pointer; and writing a second pointer referencing the added entry and a queue count of one to the queue descriptor in the second memory area in one write operation in response to the empty queue indicator indicating the packet queue as empty.

21. The article of manufacture of claim 20, wherein the first pointer comprises a tail pointer pointing to an end of the packet queue to which enqueued entries are added and the second pointer comprises a head pointer pointing to an end of the packet queue from which entries are dequeued.

22. The article of manufacture of claim 20, wherein the second pointer and the queue count in the third memory area are written to the queue descriptor in the second memory area in the one write operation in response to evicting information in the packet descriptor from the third memory area to enable reading into the third memory area information from an additional queue descriptor referencing an additional packet queue in the second memory in one read operation.

23. A system, comprising:

a first memory area;

a second memory area having a packet queue and a queue descriptor providing information on the packet queue, wherein the queue descriptor includes a pointer referencing one end of the packet queue;

a third memory area;

a queue manager enabled to perform operations, the operations comprising:

adding a packet to the first memory area;

writing an entry to the packet queue in the second memory area referencing the added packet in one write operation;

reading the pointer referencing one end of the packet queue from the queue descriptor in the second memory area into the third memory area in one read operation;

updating the pointer in the third memory area to point to the added entry in the packet queue following the adding of the entry to the packet queue and reading of the pointer into the third memory area; and writing the updated pointer in the third memory area to the queue descriptor in the second memory area in one write operation.

24. The system of claim 23, wherein the writing of the entry to the packet queue is performed in one write operation.

25. The system of claim 23, further comprising:

incrementing a counter in the third memory area for the packet queue in response to adding the packet to the first memory area.

26. The system of claim 25, wherein the queue descriptor further includes a queue count, and wherein the operations further comprise:

reading into the third memory area the queue count indicating a number of entries in the packet queue from the queue descriptor in the second memory area in one read operation in response to the counter being a last counter value;

determining an updated queue count comprising a sum of the read queue count and the last counter value; and writing the updated queue count into the queue descriptor in the second memory area in one write operation.

27. The system of claim 26, wherein the operations further comprise:
   clearing the counter in response to generating the updated queue count.

28. The system of claim 25, wherein the queue descriptor further includes a queue count and wherein the operations further comprise:
   reading into the third memory area the queue count from the queue descriptor in the second memory area indicating a number of entries in the packet queue in one read operation in response to performing a dequeue operation to remove a packet from the first memory area; and
   determining an updated queue count comprising a sum of the read queue count and the last counter value minus one.

29. The system of claim 23, wherein the pointer in the third memory area is written to the queue descriptor in the second memory area in the one write operation in response to evicting information from the queue descriptor in the third memory area to enable reading into the third memory area information from an additional queue descriptor referencing an additional packet queue in the second memory in one read operation.

30. The system of claim 23, wherein the pointer comprises a first pointer and wherein the operations further comprise:
   reading into the third memory area an empty queue indicator as part of the one read operation reading the first pointer; and
   writing a second pointer referencing the added entry and a queue count of one to the queue descriptor in the second memory area in one write operation in response to the empty queue indicator indicating the packet queue as empty.

31. The system of claim 30, wherein the first pointer comprises a tail pointer pointing to an end of the packet queue to which enqueued entries are added and the second pointer comprises a head pointer pointing to an end of the packet queue from which entries are dequeued.

32. The system of claim 30, wherein the second pointer and the queue count in the third memory area are written to the queue descriptor in the second memory area in the one write operation in response to evicting information in the packet descriptor from the third memory area to enable reading into the third memory area information from an additional queue descriptor referencing an additional packet queue in the second memory in one read operation.

33. A network processor, comprising:
   a plurality of packet engines;
   a first and second memory areas in data communication with the packet engines;
   a third memory area;
   a queue manager in one packet engine, wherein the packet engine including the queue manager is in data communication with the second and third memory areas, and wherein the queue manager is enabled to perform operations, the operations comprising:
   adding a packet to the first memory area;
   writing an entry to the packet queue in the second memory area referencing the added packet in one write operation;
   reading a pointer referencing one end of the packet queue from a queue descriptor in the second memory area into the third memory area in one read operation;
   updating the pointer in the third memory area to point to the added entry in the packet queue following the adding of the entry to the packet queue and reading of the pointer into the third memory area; and
   writing the updated pointer in the third memory area to the queue descriptor in the second memory area in one write operation.

34. The network processor of claim 33, wherein the writing of the entry to the packet queue is performed in one write operation.

35. The network processor of claim 33, wherein the operations further comprise:
   incrementing a counter in the third memory area for the packet queue in response to adding the packet to the first memory area.

36. The network processor of claim 35, wherein the queue descriptor further includes a queue count, and wherein the operations further comprise:
   reading into the third memory area the queue count indicating a number of entries in the packet queue from the queue descriptor in the second memory area in one read operation in response to the counter being a last counter value;
   determining an updated queue count comprising a sum of the read queue count and the last counter value; and
   writing the updated queue count into the queue descriptor in the second memory area in one write operation.

37. The network processor of claim 33, wherein the third memory area is implemented within the packet engine including the queue manager.

38. A network device, comprising:
   a switch fabric; and
   a plurality of line cards coupled to the switch fabric, wherein each line card includes a network processor, wherein at least one network processor on the line cards includes:
   a plurality of packet engines;
   a first and second memory areas in data communication with the packet engines;
   a third memory area;
   a queue manager in one packet engine, wherein the packet engine including the queue manager is in data communication with the second and third memory areas, and wherein the queue manager is enabled to perform operations, the operations comprising:
   adding a packet to the first memory area;
   writing an entry to the packet queue in the second memory area referencing the added packet;
   reading a pointer referencing one end of the packet queue from a queue descriptor in the second memory area into the third memory area in one read operation;
   updating the pointer in the third memory area to point to the added entry in the packet queue following the adding of the entry to the packet queue and reading of the pointer into the third memory area; and
   writing the updated pointer in the third memory area to the queue descriptor in the second memory area in one write operation.

39. The network device of claim 38, wherein the third memory area is implemented within the packet engine including the queue manager.

40. The network device of claim 38, wherein the writing of the entry to the packet queue is performed in one write operation.

41. The network device of claim 38, wherein the operations further comprise:

incrementing a counter in the third memory area for the packet queue in response to adding the packet to the first memory area.

42. The network device of claim 41, wherein the queue descriptor further includes a queue count, and wherein the operations further comprise:

reading into the third memory area the queue count indicating a number of entries in the packet queue from the queue descriptor in the second memory area in one read operation in response to the counter being a last counter value;

determining an updated queue count comprising a sum of the read queue count and the last counter value; and writing the updated queue count into the queue descriptor in the second memory area in one write operation.

* * * * *